Oct. 24, 1933.  R. F. DIRKES ET AL  1,931,790
RECEIVING RECORDER
Original Filed June 19, 1931   3 Sheets-Sheet 1

FIG. 1

INVENTORS
R. F. DIRKES
V. R. KIMBALL
BY their ATTORNEY
Eugene E. Brown

Oct. 24, 1933.  R. F. DIRKES ET AL  1,931,790
RECEIVING RECORDER
Original Filed June 19, 1931   3 Sheets-Sheet 2

INVENTORS
R. F. DIRKES
V. R. KIMBALL

ATTORNEY

Oct. 24, 1933.    R. F. DIRKES ET AL    1,931,790
RECEIVING RECORDER
Original Filed June 19, 1931    3 Sheets-Sheet 3

INVENTORS
R. F. DIRKES
V. R. KIMBALL
BY their ATTORNEY
Eugene E. Brown

Patented Oct. 24, 1933

1,931,790

UNITED STATES PATENT OFFICE

1,931,790

RECEIVING RECORDER

Robert F. Dirkes, Jamaica, N. Y., and Vernon R. Kimball, Palisade Park, N. J., assignors to The Western Union Telegraph Company, New York, N. Y., a corporation of New York Application June 19, 1931, Serial No. 545,600
Renewed March 1, 1933

42 Claims. (Cl. 178—17)

This invention relates to a receiving recorder for telegraph signals of the start-stop type and more particularly to mechanism for automatically advancing the tape through the recorder upon cessation of the signals.

In the ordinary operation of start-stop receiving recorders such as tape perforators, upon the receipt of the start or spacing signal the operating shaft of the machine is released for a single revolution during which the punch pins are selected in accordance with the received impulses and near the end of the revolution the punch hammer is brought into engagement with the punch pins to perforate the tape and to feed it forward one step through the punch block. In this manner, as each succeeding group of code impulses is received, the tape is perforated and advanced through the machine towards a tape transmitter, usually located as near as possible to the perforator. There is, however, always a minimum length of tape between the perforator and transmitter containing a considerable number of signal perforations and if for any reason the distant station discontinues transmission for a short period, which occurs at frequent intervals, a portion of the message previously transmitted will be held up in the tape between the idle perforator and the tape transmitter.

It is, therefore, one of the objects of the present invention to provide a receiving recorder in which all of the tape on which a record has been made will be advanced automatically from the recorder upon the cessation of the received signals.

Short interruptions in the signals, corresponding to only a few characters, often occur which do not seriously delay the retransmission and during such periods there is no necessity to automatically advance the tape and in fact it is a disadvantage to do so, since it interposes a length of blank tape between the perforator and transmitter, which must be advanced through the transmitter before the subsequent received signals can be retransmitted. During such short idle periods of the reperforator, the transmitter has an opportunity to use up any slack tape which may have accumulated between the transmitter and perforator.

Therefore, it is another object of the invention to provide an automatic tape feed for a recording mechanism which will not respond to interruptions of the signals of less than a predetermined period.

Another object is to cause the automatic advancement of the tape to cease after a predetermined length of tape has been ejected from the recorder as for instance as soon as sufficient tape has been fed to permit the last signal perforation to be passed through the tape transmitter.

A still further object is to provide such apparatus which is simple, reliable and which may be readily applied to existing types of reperforators.

The invention will be described with particular reference to a tape re-perforator although it is to be understood that the mechanism may be applied equally well to other types of tape recorders, as for instance, tape printers.

In accordance with the embodiment of our invention, shown in the accompanying drawings, we provide a constantly rotating worm which is adapted to be engaged by a pin carried by a pivoted arm so that the free end of the arm can be moved through an arc by the worm as it rotates. The arm is normally positioned at the forward end of the worm and is held in contact therewith during the reception of marking signals, so as to progress towards the opposite end thereof. Upon the reception of each spacing signal, however, the arm is released from the worm and returned to its normal position by a spring. If the signals cease for any reason the arm continues to travel along the worm for a definite distance, corresponding to a fixed period without affecting the operation of the control mechanism. However, if the interruption continues beyond this period a circuit is completed for sending periodic impulses through an electro-magnetic device, which operates the punch hammer successively to perforate feed holes in the tape and to advance the tape towards the transmitter. At the same time, mechanism is actuated to prevent the operation of the code punch pins so that the previous combination set up thereon will not be repeated in the tape. During the time the tape is being so advanced, the pivoted arm continues to travel along the worm and it is adjusted so that after sufficient tape has been advanced to enable the last message perforation to pass the transmitting position, the circuit of the hammer operating solenoid is opened and the feed of the tape discontinued.

In order that the invention may be more fully understood reference will be had to the accompanying drawings in which.

In start-stop systems of telegraph transmission, approximate synchronism is maintained between the rotary distributor at the transmitting station and the rotary receiving element by stopping each rotary device at the end of each signal group and starting them in a predetermined position at the beginning of each succeeding signal group. The impulses comprising each signal group consist of a start impulse, a plurality of code impulses, usually five or six, depending upon the number of selections desired, and a stop or rest impulse.

Figure 1:
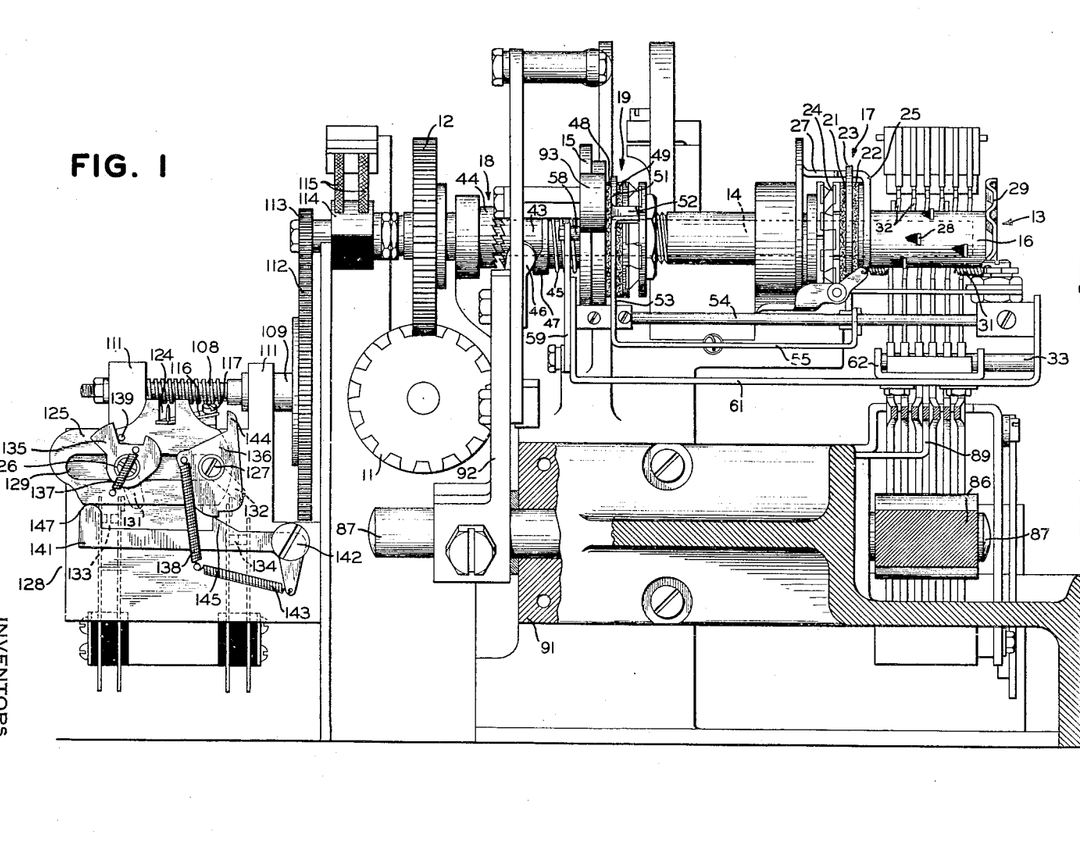
Figure 1 is a side elevation partly in section of a start-stop reperforator embodying the present invention.

Referring to Figure 1 the reperforator includes a pinion 11 driven by a constantly running motor, not shown, and engaging a gear 12 to drive the same at a uniform speed. The gear 12 is associated with a selecting unit indicated generally at 13, through a friction clutch as will presently appear.

The selecting mechanism is well known in connection with the start-stop telegraph printers and of itself forms no part of the present invention. It is shown in complete detail and described in our copending application Serial No. 503,812, filed December 20, 1930, and, therefore, only so much thereof is shown in the present application as is necessary for a complete understanding of the invention.

The driving gear 12 is rigidly secured to a shaft 14 and mounted upon the shaft for relative rotation therewith is an operating cam 15 and a selector cam drum 16. The selector cam drum is arranged to be driven from the shaft 14 by a friction clutch 17, and the operating cam 15 is driven from the shaft by a ratchet clutch 18. A second friction clutch 19 causes an initial rotation of the operating cam 15 to effect engagement of the ratchet clutch.

The friction clutch 17 comprises a pair of spaced friction disks 21 and 22 fixed to the shaft 14 between which is loosely mounted a clutch driven disk 23. The friction disks 21 and 22 are pressed into engagement with the driven disk 23 by a spring washer 24.

Secured to the rear end of the cam drum 16 is an L-shaped stop arm 25, having its free end extending through a slot 26 (Fig. 4) in the periphery of the driven clutch disk 23. The end of the arm 25 normally engages a fixed abutment 27, which retains the cam drum and the driven disk 23 against rotation under the drag of the friction disks 21 and 22.

The selector cam drum consists of a hollow cylinder having twelve cams 28 projecting from its outer surface. These cams are arranged in two spiral rows, six of the cams forming one spiral and being marking cams and the other six cams forming a second spiral disposed 180 degrees from the first and being spacing cams.

Secured to the front of the selecting cam drum is a crimped disk or flutter cam 29, having fourteen crimps or cam faces, seven of which project rearwardly and seven forwardly. The flutter cam revolves with the drum and is adopted to slide backward and forward on a sleeve on the shaft 14, it being normally urged towards the right by a spring 31 through a cam return lever, not shown. The flutter cam is also acted upon by a flutter lever, not shown, which cooperates with the return lever and with the armature of the line relay, so as to cause the cam drum to be held in its righthand position when spacing signals are received and to flutter backward and forward as it revolves when the marking signals are received.

In its rest position, with marking current on the line, the cam drum 16 is held in its rear or left-hand position so as to cause engagement of the stop arm 25 with the abutment 27.

The start signal of each signal group is always of spacing polarity and upon receipt thereof the cam drum is moved to the right freeing the stop arm 25 from the abutment and permitting the drum to be rotated by the friction clutch 17.

The cam drum revolves in substantial synchronism with the succeeding code signals so that as each code impulse is received by the line magnet each succeeding cam 28 is brought into selecting position. If the impulse is spacing, the drum will rest against its right-hand stop at the time the impulse is received and for marking it will rest against its left-hand stop. The last impulse of each signal group being marking in every case, the drum will be moved to the left causing re-engagement of the stop arm 25 with the abutment 27 at the end of the revolution.

Disposed along the selecting cam drum are six selecting levers 32, pivoted at 33 (Fig. 4) and having two spaced arms 34 and 35, the former being disposed above the cam drum and the latter below the cam drum. The ends of the arms are offset with respect to each other, the lower or marking arm being offset towards the back and the upper or spacing arm being offset towards the front. This is done so that when the marking cams line up with the marking arms the spacing cams will pass to the rear of the spacing arms and when the spacing cams are in line with the spacing arms the marking cams will pass in front of the marking arms.

Figures 4, 5:
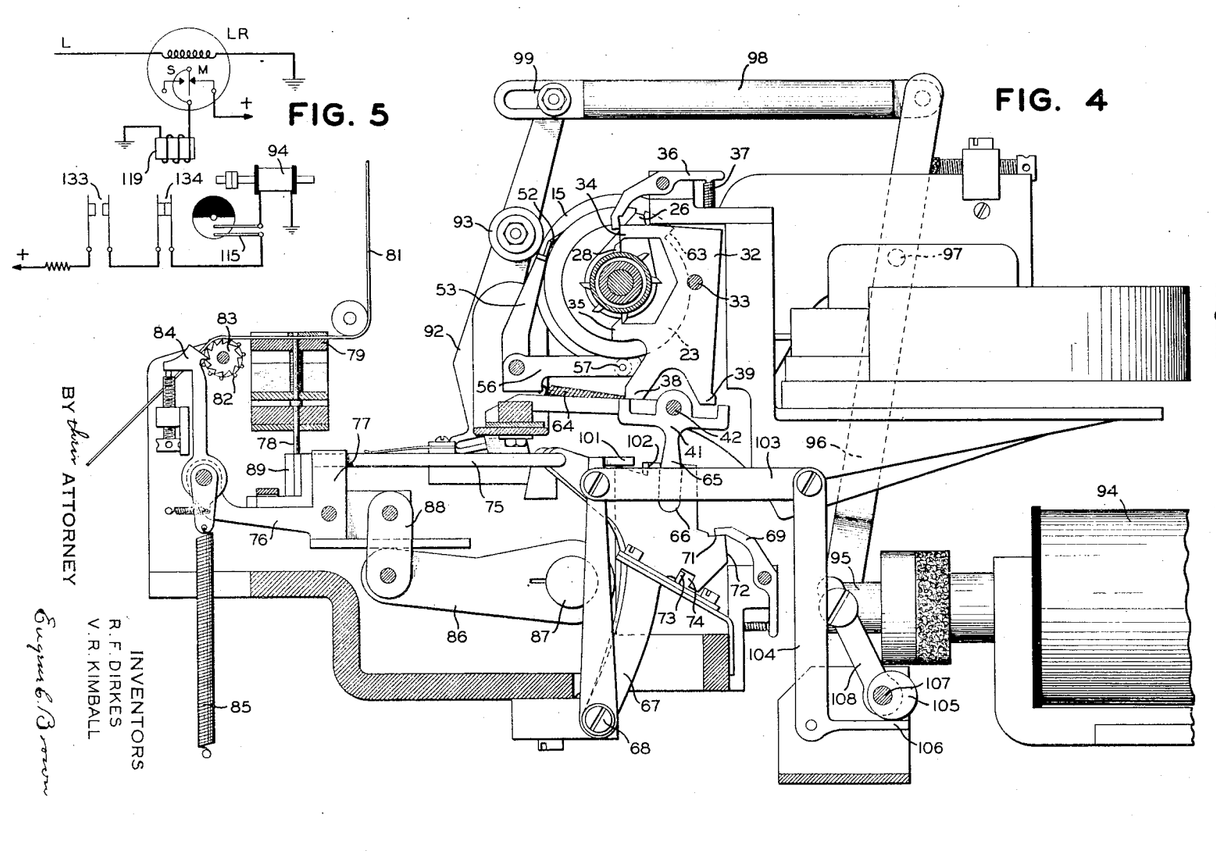
Figure 4 is a front view, partly in section, viewed from the right side of Figure 1.
Figure 5 represents the circuit arrangement of the control mechanism.

The selecting levers 32 will be rocked either clockwise or counterclockwise as the cam drum revolves, depending upon whether the cam drum is shifted to the right for a spacing signal to cause the spacing cam to line up with the spacing arm or to the left for a marking signal to cause one of the marking cams to line up with one of the marking arms. The selecting levers are thus set up in succession as each impulse is received and they are held in their selected position by individual detents 36 engaging either with the tops or the front thereof under the pressure of the detent springs 37.

Two transfer arms 38 and 39 forming a part of the selecting levers 32 are disposed above the spaced arms of a series of six transfer levers 41 carried on a pin 42, capable of being raised after the selection has been set up, to rock the transfer levers either clockwise or counterclockwise by engagement of one of their spaced arms with one of the arms 38 or 39, depending upon the position of the selecting levers.

The transfer levers are raised through the action of the operating cam 15. Referring again to Fig. 1, cam 15 is secured to the driven member 43 of the clutch 18, the driving member 44 being rigid with the shaft 14. The clutch members are normally held disengaged against the action of a spring 45, by a fixed arm 46 engaging a cam face on the annular shoulder 47 of the driven clutch member 43.

The friction clutch 19 is of the same construction as the clutch 17 and comprises two friction discs 48 and 49 secured to the shaft 14 to rotate therewith and having loosely mounted therebetween the driven clutch disc 51 which is provided with a forwardly extending stop member 52. The stop member 52 is ordinarily engaged by a stop arm 53 pivoted on a rod 54 and having a U-shaped extension 55 provided with an inturned arm 56 projecting under the driven disc 23 of the clutch 17. A roller 57 carried by the arm 56 extends beneath the disc 23, which is cam shaped as shown in Figure 4, the raised portion of the cam normally engaging the roller to hold the stop arm 53 in engagement with the stop member 52.

The operating cam 15 is fixed to the disc 49 to rotate therewith and has an internal eccentric cam groove (not shown) in which rides a pin 58, carried upon one arm 59 of a U-shaped lever 61. The lever 61 is pivoted at each end upon the rod 54 and has a U-shaped bracket 62 mounted thereon. The pin 33 carrying the transfer levers 41 extends between the upwardly projecting arms of the bracket 62.

The operation of the transfer mechanism is as follows. During the rotation of the cam drum 16 and just after the reception of the fourth impulse of the signal group, the depression 63 in the edge of the driven clutch disc 23 comes opposite the roller 57 carried by the lever 56, permitting the lever to be rocked outwardly by the spring 64 so as to move the stop arm 53 out of engagement with the stop member 52 and permitting the clutch disc 51 of the clutch 19 to rotate carrying with it the operating cam 15. After the operating cam has rotated a few degrees, the ratchet clutch 18 is brought into engagement by movement of the cam face of the collar 47 away from the arm 46. Thereupon the operating cam is positively driven nearly to the end of its revolution, at which point the ratchet clutch is again disengaged by the collar member 47 and the operating cam is driven by the friction clutch until it is again stopped by engagement of the stop arm 53 with the stop member 52.

As the operating cam revolves it rocks the U-shaped bracket 62 so as to move the transfer levers upwardly against one end or the other of the selector levers 32. This occurs after the last selecting impulse of the group has been received.

As shown in Fig. 4, the depending arm 65 of each of the transfer levers engages in a recess 66 in individual pin selecting levers 67 pivoted to the frame at 68. Each lever is provided with a pivoted locking latch 69 adapted to engage one or the other of the surfaces 71 or 72 to lock the lever in its adjusted position. The movement of the lever is limited in either direction by a limiting stop 73 engaging in a notch 74 in each of the levers 67.

An interponent bar 75 is attached to each of the pin selecting levers 67 and has its free end resting upon the punch hammer 76. The interponent bars slide in slots formed in the upward extension 77 of the punch hammer and in their forward position extend beneath the punch pins 78, one of which is provided for each interponent bar. In their rearward positions the interponent bars 75 are moved from underneath the pins. Consequently upon upward movement of the punch hammer, their respective pins are engaged or not engaged to perforate the tape depending upon the position of the interponent bars.

The punch pins extend upwardly through the punch block 79 across which the tape 81 is drawn by a feed wheel 82. A ratchet wheel 83 on the shaft of the feed wheel is engaged by a feed pawl 84 secured to the forward extension of the punch hammer 76. The punch hammer is normally urged downward by a strong spring 85 and is forced upwardly to drive the punch pins through the tape by means of a rock arm 86 fixed to the shaft 87 and connected to the punch hammer by a link 88. On the upward movement of the punch hammer the pawl 84 is moved upwardly to engage the next tooth of the ratchet wheel and on the return movement, the ratchet wheel and feed wheels are rotated to advance the tape the distance of one row of perforations. The central one of the punch pins, not shown, is preferably of smaller diameter and serves to produce the feed perforations in which the pins of the feed wheel 82 engage. This pin is actuated through an interponent bar 89 permanently retained beneath the pin, this bar not being provided with a pin selecting lever 67.

The rock shaft 87 extends through a bearing block 91 and at its end opposite from the rock arm 86, it has a lever 92 rigidly secured thereto, which extends upwardly and carries a roller 93 disposed opposite to the operating cam 15. The cam 15 is so shaped that upon each revolution of its shaft 14, it rocks the shaft 87 to actuate the punch and tape feed mechanism. This occurs at the end of each selecting cycle after all of the pin selecting levers 67 have been actuated.

In the normal operation of the perforator as each signal group is received, the interponent bars are adjusted beneath the proper punch pins and the punch mechanism operated to perforate the tape and to advance it one step.

With the mechanism so far described, should the signals cease for any reason, the shaft 14 remains idle with the interponent bars locked in position corresponding to the last perforated character in the tape and no further operation of the system occurs. Consequently there will be a considerable number of groups of perforations in the tape between the punch block and the tape transmitter which ordinarily is located adjacent to the perforating machine. The tape transmitter has not been shown but it is well known in the art and may be of the form shown in the patent to G. R. Benjamin, No. 1,298,440, granted March 25, 1919.

In order that the information contained in the tape may be transmitted without delay when such interruptions occur, we have provided means for automatically continuing the advancement of the tape through the perforator for a sufficient distance to bring the last row of perforations into transmitting position at the tape transmitter. This mechanism will now be described.

In order to operate the perforating mechanism independently of the shaft 14, a solenoid 94 is provided having a plunger 95 connected to a lever 96, pivoted at 97 and having its upper end connected to the rock shaft operating lever 92 by means of a link 98. The end of the link 98 is slotted at 99 so that during the normal operation of the machanism, in response to received signals, the lever 92 rocks idly in the slot 99. The lever 92 will be operated, however, independently of the cam 15 upon each stroke of the solenoid plunger, thus causing the punch hammer to be elevated to perforate the tape and to actuate the feeding mechanism to advance the tape.

In order that the feed openings only will be punched at such times, the interponent bars 75 are all withdrawn from beneath their punch pins by means of a bail 101, pivoted at 68 and engaging the shoulders 102 of the pin selecting levers 67. The bail is drawn backward by a link 103 attached to the upper arm of a bell crank lever 104, rocked by a cam 105 engaging the horizontal arm 106 of the bell crank. The cam is carried by a shaft 107 rocked upon each stroke of the solenoid plunger by an arm 108 secured to the plunger 95. Consequently, each time the solenoid is energized to raise the punch hammer, all of the interponent bars are withdrawn except that associated with the feed pin.

The solenoid is normally inoperative during the reception of signals and is adapted to be successively energized when the signals cease for at least a predetermined interval to produce the feed holes and to advance the tape towards the transmitter.

The mechanism for bringing the auxiliary punch operating mechanism into operation comprises a worm 108 (Figs. 1, 2 and 3) formed on a shaft 109 mounted in bearings 111 and having a gear 112 meshing with a pinion 113 on the end of the main shaft 14, whereby the worm is rotated continuously. A commutator 114 provided with brushes 115 is also mounted upon the shaft 14 to rotate therewith. An arm 116 is disposed beneath the worm and is pivoted at one end 117 to the free end of the armature 118 of a magnet 119. A pin 121 in the end of the arm 116 is arranged to engage the convolutions of the worm so as to swing the lever through an arc as the worm revolves. When the magnet is deenergized the pin is held out of engagement with the worm by a spring 122 and at such times the arm 116 is rocked to its initial or left hand position by means of a spring 123. The magnet 119 is arranged in the line circuit so as to be energized by marking signals, as shown in Figure 5, and to be deenergized upon the receipt of spacing signals. With steady marking current on the line the arm 116 is moved along the worm and as each spacing signal is received it is restored to its initial left hand position.

Figure 2:
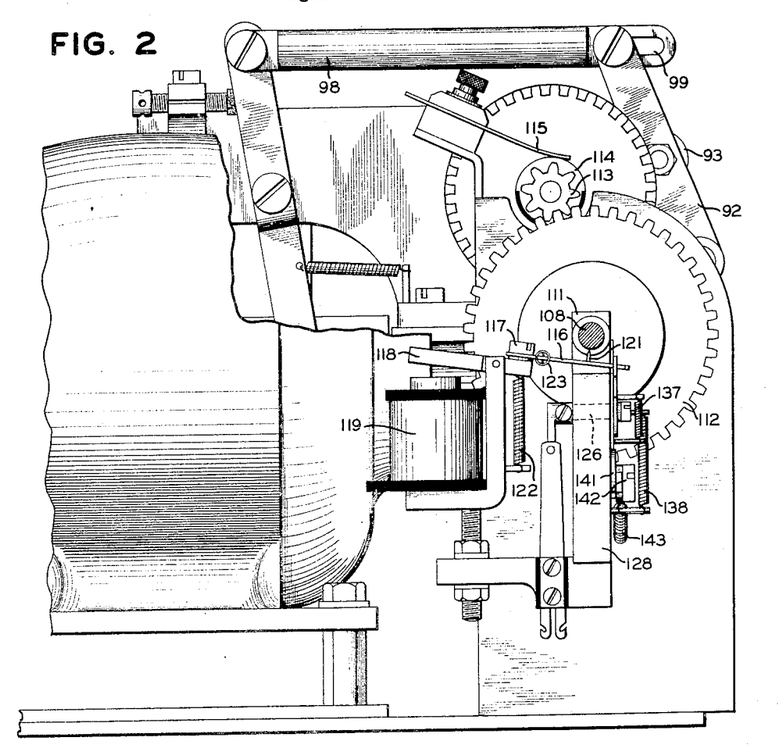
Figure 2 is a rear elevation as viewed from the left in Figure 1.

The lever 116 extends through a slot 124 in a slide 125. The slide is mounted upon a pair of pins 126 and 127 extending through a plate 128 and being journaled therein. The slide has an elongated slot 129, whereby it may be moved backward and forward with the lever 116.

On the opposite side of the plate 128 from the slide 125, the pins 126 and 127 are provided with downwardly extending lugs 131 and 132 respectively, adapted to engage contacts 133 and 134. On the outside of the pins 126 and 127 beyond the slide 125 irregular shaped plates 135 and 136 are secured. The plate 135 is normally held in the position shown in Figure 1 by a toggle spring 137, in which position the contacts 133 are open. The plate 136 is also normally held in the position shown in Figure 1 by a spring 138, in which position the contacts 134 are closed. A pin 139, projecting outwardly from the slide 125, normally extends through a notch in the upper side of the plate 135 and a latch bar 141 pivoted at 142 is urged upward against the slide by a spring 143.

The operation of the control mechanism is as follows. Assuming the commutator and the worm to be rotating continuously and a spacing signal to have been received forming a part of the last signal group received over the line, the magnet 119 is de-energized, thereby positioning the slide and the pivoted lever 116 to its extreme left hand position. If no further signal impulses are received and a steady marking battery is applied to the line, the magnet 119 is energized to bring the pin 121 into engagement with the worm, thus causing the arm to move slowly across the worm. During the first part of this movement as the pin 139 on the slide moves from the front to the rear of the notch in the plate 135, nothing occurs. The extent of this movement determines the period during which the line is allowed to remain idle without starting the auxiliary feed mechanism into operation. At the end of this period the continued movement of the slide causes the pin 139, by engagement with the rear wall of the notch, to rock the plate clockwise, closing the contacts 133.

At this time the circuit is completed (see Figure 5) from battery through the contacts 133 and 134 to the brushes 115 on the commutator and thence to the feed operating solenoid 94. Upon each revolution of the shaft 14, an operating impulse is supplied to the solenoid to rock the lever 96 and thereby raise the punch hammer to produce a feed perforation to the tape and to advance the tape through the machine.

Figure 3:
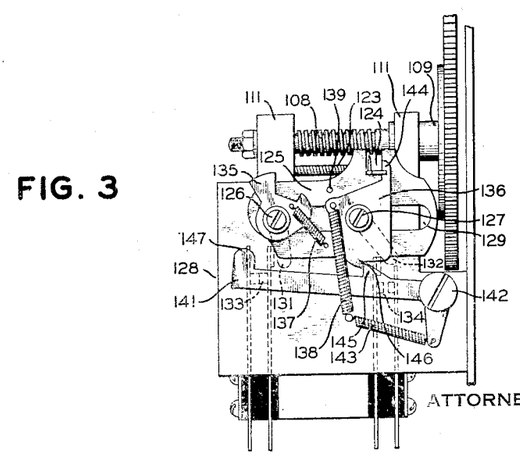
Figure 3 is a detail of the feed control mechanism in the opposite position from that shown in Figure 1.

During this time the slide 125 continues to move to the right and as it passes the notch in the plate 135, the spring 137 serves to retain the plate in its circuit closing position, as shown in Figure 3. As the slide reaches its extreme right hand position the pivoted arm 116 engages a shoulder 144 on the plate 136 and rocks it against the tension of spring 138, thereby opening contacts 134. This interrupts the solenoid circuit and stops the tape perforating and feeding operation. At the same time a projection 145 on the latch bar 141 is moved up by the spring 143 to engage against the shoulder 146 of the plate 136 to lock the same in its contact opening position. The parts remain in this position as long as no further spacing signals are transmitted.

When the transmission of signals over the line is resumed, the first spacing signal, which is the start signal of the group, causes the line relay LR to move to its spacing contact, de-energizing the magnet 119, thereby releasing the pin 121 from the worm and permitting the arm 116 and slide 125 to return to their left hand positions, by the spring 123. The pivoted arm 116 as it moves to the left disengages itself from shoulder 144 on plate 136. However, plate 136 remains in its position shown in Fig. 3 by reason of projection 145 on latch bar 141 remaining behind shoulder 146 thus keeping contacts 134 open.

As the slide moves to the left under the influence of the pivoted arm, pin 139 in slide 125 comes into engagement with the front wall of the notch in the plate 135 and rocks the same counter clockwise until the spring 137 passes to the left of the pivot point, thereby opening contacts 133. About this time the beveled upturned end 147 of the latch bar is forced downward by the left end of the slide. This releases plate 136 allowing it to return to its normal position and close contacts 134. Thus the circuit to solenoid 94 is kept open between the end of one group of tape feeding impulses and the beginning of the succeeding group, and clipping of the first received character, after feeding of the tape, is prevented.

The apparatus is now in normal position to again respond to advance the tape a predetermined distance should another interruption in the signals occur.

It is obvious that many changes and modifications may be made in the construction of the mechanism and in the adaptation of the invention to other types of tape perforators without departing from the spirit or essential attribute of the invention and, therefore, we do not desire to be limited to the specific details shown and described, except in accordance with the appended claims.

What we claim is:

1. In combination a source of code signal impulses, a tape perforating mechanism, a tape feed mechanism, means for operating the perforating mechanism in response to each group of code signal impulses received from said source, means for successively operating the perforating mechanism upon an interruption of said signals, means for delaying the starting of said latter operation of the perforating mechanism for a predetermined period after the interruption of said signals, and means for actuating the tape feed mechanism each time the perforating mechanism operates, to advance the tape through the perforator.

2. In combination a source of code signal impulses, a tape perforating mechanism, means for operating the perforating mechanism in response to each group of code signal impulses received from said source, means for automatically operating the perforating mechanism upon an interruption of said signals and means for delaying the starting of said automatic operation for a predetermined period after the interruption of said signals.

3. In combination a source of code signal impulses, a tape perforating mechanism, means for operating the perforating mechanism in response to each group of code signal impulses received from said source, means for automatically operating the perforating mechanism a predetermined number of times upon an interruption of said signals and means for delaying the starting of said automatic operation for a predetermined period after the interruption of said signals.

4. In combination a source of code signal impulses, a tape perforating mechanism for producing code signal perforations and feed perforations in the tape, a tape feed mechanism, means for operating the perforating mechanism in response to each group of code signals received, means for producing a series of feed perforations in the tape upon the interruption of said signals means for actuating the tape feed mechanism once for each feed perforation produced and means for delaying the operation of said feed perforating mechanism for a predetermined period after the interruption of said signals.

5. In a tape perforating mechanism, a source of code signal impulses, means for advancing the tape through the perforator in response to each signal group received, separate means for automatically advancing the tape through the perforator upon interruption of the signals and means for delaying the starting of said separate means for a predetermined period after the interruption of said signals.

6. In a tape recorder mechanism, a source of code signal impulses, means for advancing the tape through the recorder in response to each signal group received, separate means for automatically advancing the tape through the recorder upon interruption of the signals, means for delaying the starting of said separate means for a predetermined period after the interruption of said signals, and means for stopping the automatic advancement of the tape after a predetermined length thereof has been so advanced.

7. In combination, a source of code signal impulses, a tape recorder, a tape feed mechanism therefor, means started into operation by the first impulse of a signal group to operate said tape feed mechanism, said means being stopped after the reception of the last signal impulse of said group, auxiliary means for operating said tape feed mechanism upon cessation of said signals, said auxiliary means starting its operation a predetermined time after the reception of the last impulse of the preceding group.

8. In combination, a source of code signal impulses, a tape perforator, a plurality of perforating elements therefor for producing code perforations and feed perforations, a selecting mechanism responsive to said code signals for setting up different combinations for said code perforating elements, a tape feed mechanism, means for operating said perforating elements and tape feed mechanism once for each code signal group received, separate means for actuating said perforating elements and feed mechanism upon cessation of signals, and means acting to set up said perforating elements in a non-operative manner prior to said last mentioned actuation thereof.

9. In combination, a source of signal impulses, a tape perforator, a plurality of perforating elements therefor for producing code perforations and feed perforations, a selecting mechanism responsive to said code signals for setting up different combinations for said perforating elements, a tape feed mechanism, means for operating said perforating elements and feed mechanism once for each code signal group received, separate means for actuating said perforating elements and feed mechanism upon cessation of signals, means acting to set up said perforating elements in a non-operative manner prior to said last mentioned actuation thereof, and means for delaying said last mentioned actuation of the perforating elements for a predetermined period after the cessation of signals.

10. In combination, a source of signal impulses, a tape perforator, a plurality of perforating elements therefor for producing code perforations and feed perforations, a selecting mechanism responsive to said code signals for setting up different combinations for said perforating elements, a tape feed mechanism, means for normally retaining said set up during at least a portion of the period of the succeeding signal group, means for operating said perforating elements and feed mechanism once for each code signal group received, means for actuating at least one of said perforating elements a predetermined number of times upon cessation of signals, and means for destroying the previous set up of the remainder of said perforating elements prior to said last mentioned actuation thereof.

11. In combination, a source of code signal impulses, a tape perforator, a plurality of code perforating elements and a feed perforating element, an interponent bar for each of said code perforating elements, a selecting mechanism responsive to code signal combinations for interposing said interponent bars in line with said code perforating elements in accordance with each signal combination, a tape feed mechanism, means for operating said interponent bars and the selected perforating elements therewith, once for each code signal combination received, means for actuating said feed perforating element upon cessation of signals and means for withdrawing said interponent bars from alignment with said perforating elements prior to said last mentioned actuation of the feed perforating element.

12. In a start-stop receiving perforator, a perforating mechanism, a selecting mechanism, a tape feed mechanism, means responsive to a signal group for causing said selecting mechanism to complete one cycle of operation, means acting during said cycle to operate said perforating and tape feed mechanism, auxiliary means for operating said perforating and tape feed mechanism upon the cessation of signals, means operating over a predetermined cycle for controlling said auxiliary means, said control means being rendered operative to start this cycle upon reception of marking conditions and being returned to its initial position in the cycle upon the reception of spacing conditions.

13. In a start-stop receiving recorder, a recording mechanism, a selecting mechanism, a tape feed mechanism, means responsive to a signal group for causing said selecting mechanism to complete one cycle of operation, means acting during said cycle to operate said recording and tape feed mechanism, electro-magnetic means for operating said tape feed mechanism upon cessation of said signals, means operating over a predetermined path for controlling said electro-magnetic means, said control means being rendered operative to start its movement upon the cessation of signals and being returned to its initial position in the path upon reception of signals, and means for completing an intermittent circuit to said electro-magnetic device during the movement of said control means over a portion of its path.

14. In a start-stop receiving perforator, a perforating mechanism, a selecting mechanism, a tape feed mechanism, means responsive to a signal group for causing said selecting mechanism to complete one cycle of operation, means acting during said cycle to operate said perforating and tape feed mechanism, auxiliary means operating for a predetermined cycle for controlling said perforating and tape feeding mechanism, said control means being rendered operative to start its cycle upon cessation of signals and being returned to its initial position in the cycle upon reception of signals and means for successively operating said perforating and tape feed mechanism during a portion of the time said control means is completing its cycle.

15. In a start-stop receiving recorder, a recording mechanism, a selecting mechanism, a tape feed mechanism, means responsive to a signal group for causing said selecting mechanism to complete one cycle of operation, means acting during said cycle to operate said recording and tape feed mechanism, auxiliary means operating over a predetermined cycle for controlling said tape feeding mechanism, said control means being rendered operative to start its cycle upon cessation of signals and being returned to its initial position in the cycle upon reception of signals, and means for starting successive operations of said tape and feed mechanism at an intermediate point in the cycle of said control means and for stopping said successive operations when the control means reaches the end of its cycle.

16. In a start-stop receiving perforator, a perforating mechanism, a selecting mechanism, a tape-feed mechanism, means responsive to a signal group for causing said selecting mechanism to complete one cycle of operation, means acting during said cycle to operate said perforating and tape feed mechanism, a normally inoperative electro-magnetic means for operating said perforating and tape feed mechanism, and means for completing an intermittent circuit to said electro-magnetic means upon cessation of signals, to continue the operation of said perforating and tape feed mechanism.

17. In a start-stop receiving perforator, a perforating mechanism, a selecting mechanism, a tape feed mechanism, means responsive to a signal group for causing said selecting mechanism to complete one cycle of operation, means acting during said cycle to operate said perforating and tape feed mechanism, a normally inoperative electro-magnetic means for operating said perforating and tape feed mechanism, a circuit interrupter and means for completing a circuit to said electro-magnetic means through said circuit interrupter upon cessation of signals, to continue the operation of said perforating and tape feed mechanism.

18. In a receiving perforator, having selecting mechanism which retains the last selection, after perforation of the tape and until changed by the following selection, means for actuating the perforating mechanism a definite number of times, upon an interruption of signals without repeating the last character perforated.

19. In combination, a perforating mechanism having a plurality of perforating elements, means for selecting said perforating elements in accordance with received code signals, said selection normally being retained until the reception of the next code signal, and means acting after a predetermined period of interruption of said signals to annul the previous selection and to successively operate the perforating mechanism.

20. In combination, a source of telegraph code signal impulses, a receiving instrument, a tape feed mechanism therefor, means for operating the tape feed mechanism in response to each group of code signal impulses received from said source, means for automatically operating the tape feed mechanism upon an interruption of said signals and means for delaying the starting of said automatic operation for a predetermined period after the interruption of said signals.

21. In a tape recorder, a source of code signal impulses, means for ejecting the tape from the recorder in response to each signal group received, separate means for automatically ejecting tape from the recorder upon interruption of the signals and means for delaying the starting of said separate means for a predetermined period after the interruption of said signals.

22. In combination, a source of code signal impulses, a tape recording mechanism, a selecting mechanism responsive to said code signal impluses for controlling said recording mechanism, a tape feed mechanism, means for operating the recording mechanism and tape feed mechanism once for each code signal group received, said tape feed mechanism being operable upon cessation of said code signal impulses and means acting to render said recording mechanism inoperative prior to the last mentioned actuation of the tape feed mechanism.

23. In a start-stop receiving recorder, a recording mechanism, a selecting mechanism, a tape feed mechanism, means responsive to a signal group for causing said selecting mechanism to complete one cycle of operation, means acting during said cycle to operate the recording and tape feed mechanism, auxiliary means for operating said tape feed mechanism upon cessation of signals, means operating over a predetermined cycle for controlling said auxiliary means, said controlled means being rendered operative to start each cycle upon reception of marking conditions and being returned to its original position in the cycle upon the reception of spacing conditions.

24. In a start-stop receiving recorded, a recording mechanism, a selecting mechanism, a tape feed mechanism, means responsive to a signal group for causing said selecting mechanism to complete one cycle of operation, means acting during said cycle to operate the recording and tape feed mechanism, a normally inoperative, electro-magnetic means for operating the tape feed mechanism and means for completing an intermittent circuit to said electromagnetic means upon cessation of signals to continue the operation of the tape feed mechanism.

25. In a telegraph receiving recorder having selecting mechanism, which retains the last selection after recording the same upon a tape and until changed by the following selection, means for actuating the recording mechanism a definite number of times to eject a predetermined number or quantity of tape therefrom upon an interruption of signals without repeating the last character selected.

26. In combination, a recording mechanism, a tape feed mechanism, means for selectively operating said recording mechanism in accordance with received code signals, said selection normally being retained until the reception of the next code signal and means acting after a predetermined period of interruption of said signals to render the recording mechanism inoperative and to eject a predetermined length of tape from the recorder.

27. In combination, a recording mechanism, a tape feed mechanism, means for selectively operating said recording mechanism in accordance with received code signals, said selection normally being retained until the reception of the next code signal and means acting upon interruption of said signals to render the recording mechanism inoperative and to eject tape from the recorder.

28. In a telegraph receiving instrument, a recording mechanism, a tape feed mechanism, means operated in response to each code signal group received for operating said recording and tape feed mechanism, an auxiliary mechanism for operating said tape feed mechanism and means operative automatically upon each cessation of received code signals for intermittently operating said auxiliary mechanism.

29. In a telegraph receiving instrument, a recording mechanism, a tape feed mechanism, means operated in response to each code signal group received for operating said recording and tape feed mechanism, an auxiliary mechanism for operating said tape feed mechanism including an electro-magnetic device and means operative automatically upon each cessation of code signals for completing an intermittent circuit to said electro-magnetic device.

30. In a telegraph receiving instrument, a recording mechanism, a tape feed mechanism, means operated in response to each code signal group received for operating said recording and tape feed mechanism, an auxiliary mechanism for operating said tape feed mechanism including an electro-magnetic device, a circuit interrupter and means operating automatically upon each cessation of received code signals for completing a circuit to the electro-magnetic device through said circuit interrupter.

31. In a telegraph receiving instrument, a tape perforating mechanism adapted to produce feed perforations and code perforations in a tape, a tape feed mechanism, a selector mechanism responsive to permutation code signals, said selector mechanism being movable from a normal position during the reception of each signal group and being stopped following the last impulse of each group, means for selectively operating said perforating mechanism during each cycle of operation of said selector mechanism and auxiliary means independent of and effective when said selector mechanism is at rest for operating said perforating mechanism, to produce feed perforations in said tape.

32. In a recording machine, a selector mechanism responsive to permutation code signals received over a line, for producing a record on a tape, a tape feed mechanism actuated upon each operation of said selector mechanism to advance the tape, a worm controlled by line conditions and operable independently of said selector mechanism, and means adapted to travel along said worm when said selector mechanism is at rest and serving to initiate the operation of said feed mechanism.

33. In a recording machine, a selector mechanism responsive to code signals received over a line for producing a record on a tape, a tape feed mechanism actuated upon each operation of said selector mechanism to advance the tape, a worm controlled by line conditions and operable independently of said selector mechanism, and means adapted to travel along said worm, said means being conditioned to travel along said worm, upon inaction of said selector mechanism and serving after a predetermined travel thereof to initiate the operation of said feed mechanism.

34. In a recording machine, a selector mechanism responsive to code signals received over a line for producing a record on a tape, a tape feed mechanism actuated upon each operation of said selector mechanism to advance the tape, a worm controlled by line conditions and operable independently of said selector mechanism, and means adapted to travel along said worm, said means being conditioned to travel along said worm upon inaction of said selector mechanism and serving after a predetermined travel thereof to initiate the operation of said feed mechanism and after a predetermined further travel thereof, to stop the operation of said feed mechanism.

35. In a receiving perforator, a selector responsive to received permutation code signals, a perforating mechanism controlled by said selector to produce code perforations and feed perforations in the tape, means to advance the tape following each operation of said perforating mechanism, a worm operable independently of said selector, an arm arranged to travel along said work on cessation of said signals and serving to start the operation of said perforating mechanism to produce feed holes only in the tape, said arm acting after a predetermined travel thereof to stop said feed hole perforating mechanism, means acting during the reception of a succeeding code signal to return said arm to its initial position and means to prevent operation of said feed hole perforating mechanism during the return movement of said arm.

36. In a receiving perforator, a selector responsive to received permutation code signals, a perforating mechanism controlled by said selector to produce code perforations and feed perforations in the tape, means to advance the tape following each operation of said perforating mechanism, a worm operable independently of said selector, an arm arranged to travel along said worm on cessation of said signals and serving to start the operation of said perforating mechanism to produce feed holes only in the tape, and means latched in position after a predetermined travel of said arm to stop said feed hole perforating mechanism.

37. In a receiving perforator, a selector responsive to received permutation code signals, a perforating mechanism controlled by said selector to produce code perforations and feed perforations in the tape, means to advance the tape following each operation of said perforating mechanism, a worm operable independently of said selector, an arm arranged to travel along said worm on cessation of said signals and serving to start the operation of said perforating mechanism to produce feed holes only in the tape, and means latched in position after a predetermined travel of said arm to stop said feed hole perforating mechanism, means acting during reception of the succeeding code signal to return said arm to its initial position, said latch serving to prevent further operation of said feed hole perforating mechanism until actuated by the succeeding forward movement of said arm.

38. In a receiving perforator, a drive shaft, a normally inactive selector mechanism, means responsive to received permutation code signals for operating said selector mechanism from said drive shaft, a perforating mechanism for producing feed perforations and code perforations, controlled by said selector mechanism and other means actuated independently of code signals and driven by said shaft, when said selector mechanism is at rest, for effecting the operation of said perforating mechanism to produce a succession of feed holes only in said tape.

39. In a receiving perforator, a perforating mechanism having permutation code punch pins and a feed punch pin, a selector normally at rest and movable through a definite cycle on reception of each code signal to determine the selection of said code pins, means released by such movement of the selector mechanism for operating said feed and code pins and auxiliary means for operating said feed means only, said auxiliary means being inactive during operation of said selector and being rendered active automatically upon cessation of signals and consequent inaction of said selector mechanism, to produce a succession of feed perforations in the tape.

40. In a telegraph recording machine, a tape, a selector responsive to received permutation code signals for producing a record on said tape, a continuously rotatable drive shaft for said selector, means for releasing said selector for one revolution on reception of each code signal, tape feed mechanism driven by said shaft under the control of said selector and auxiliary means also driven by said shaft and acting automatically during predetermined rest periods of said selector for effecting the operation of said feed mechanism once for each revolution of said shaft.

41. In a receiving perforator, a tape, a selector responsive to received permutation code signals, a continuously rotatable drive shaft for said selector, means for releasing said selector for one revolution on the reception of each code signal, feed hole and code hole perforating means driven by said shaft under the control of said selector and auxiliary means also driven by said shaft and acting automatically during predetermined rest periods of said selector for supplying intermittent operating impulses to said feed hole perforating means.

42. In a receiving perforator, a perforating mechanism, a main operating mechanism therefor acting during active signal periods and an auxiliary operating mechanism therefor actuated automatically during predetermined inactive signal periods, said auxiliary operating mechanism including a worm, an arm traveling along said worm, a member movable by said arm and a pivoted latch engaged by said member and acting after a predetermined movement thereof to effect the operation of said auxiliary operating mechanism, said member on continued movement acting to discontinue the operation of said auxiliary operating mechanism.

ROBERT F. DIRKES.
VERNON R. KIMBALL.